United States Patent [19]

Koberstein et al.

[11] 4,105,590

[45] Aug. 8, 1978

[54] CATALYSTS AND THE PROCESS FOR THEIR PRODUCTION

[75] Inventors: Edgar Koberstein, Alzenau; Eduard Lakatos, Rheinfelden, both of Germany

[73] Assignee: Deutsche Gold- und Silber-Scheideanstalt vormals Roessler, Frankfurt am Main, Germany

[21] Appl. No.: 744,079

[22] Filed: Nov. 22, 1976

Related U.S. Application Data

[63] Continuation of Ser. No. 610,033, Sep. 3, 1975, abandoned, which is a continuation of Ser. No. 344,459, Mar. 23, 1973, abandoned.

[30] Foreign Application Priority Data

Mar. 25, 1972 [DE] Fed. Rep. of Germany ....... 2214604

[51] Int. Cl.$^2$ ................ B01J 21/04; B01J 23/60; B01J 23/64; B01J 23/74
[52] U.S. Cl. .................... 252/464; 252/465; 423/213.5
[58] Field of Search ................ 252/464, 465, 466 PT; 423/213.2, 213.5

[56] References Cited

U.S. PATENT DOCUMENTS

| | | | |
|---|---|---|---|
| 3,257,163 | 6/1966 | Stiles | 423/213.2 |
| 3,669,906 | 6/1972 | Koberstein et al. | 252/465 |
| 3,741,725 | 6/1973 | Graham | 423/213.5 |
| 3,787,322 | 1/1974 | Koberstein et al. | 252/465 |
| 3,787,333 | 1/1974 | Ichihara et al. | 252/465 |

*Primary Examiner*—W. J. Shine
*Attorney, Agent, or Firm*—Beveridge, DeGrandi, Kline & Lunsford

[57] ABSTRACT

A catalyst is described capable of inducing reduction in nitrogen oxide pollutants of exhaust gases from internal combustion engines and industrial plants. The catalyst composition is formed from a mixture of catalytically active aluminum oxides and a mixture of at least two metal oxides, one which is chromium oxide and the other is an oxide of an element of the First Transition Series, impregnated with about 1% by weight of an impregnant comprising a catalytically active noble metal compound. An optional constituent of the catalyst compositions includes 0.5–10% by weight of beryllium, magnesium, calcium, strontium or barium in the mixed oxide composition.

48 Claims, No Drawings

CATALYSTS AND THE PROCESS FOR THEIR PRODUCTION

REFERENCE TO RELATED APPLICATIONS

This application is a continuation of application Ser. No. 610,033, filed Sep. 3, 1975, now abandoned, which in turn is a continuation of application Ser. No. 344,459, filed Mar. 23, 1973, now abandoned.

The invention relates to a process for the production of catalysts suitable for the reduction of nitrogen oxides in oxygen atmospheres and the simultaneous oxidation of combustible harmful substances conventionally classified as pollutants in exhaust gases from internal combustion engines and industrial plants. Organic compounds and carbon monoxide also present in such exhaust gas pollutants are purified by oxidation.

In particular, the invention relates to a catalyst and process for the production of catalysts suitable for the reduction of nitrogen oxides in oxygen-containing surroundings and the oxidation of combustible harmful substances, which comprises as a starting material eta and gamma-aluminum oxide, which is catalytically active, and more than 50% by weight of at least two metal oxides, one of which is chromium oxide and the other oxide is selected from oxidic compounds of elements in the First Transition Series. Such a composition will be hereinafter referred to as a starting catalyst or a starting material. The starting material may, optionally, contain in addition a maximum of 10% by weight of compounds of elements contained in Group II of the Periodic Table.

Catalysts of this basic composition, referred to herein as starting materials or starting catalysts, are conventionally called mixed catalysts. Such catalysts are capable of high degrees of conversion of pollutants in exhaust gases. Moreover, such compositions are characterized by extraordinary stress limits and insensitivity to high operating temperatures. In the case of catalytic purification of exhaust gases containing oxidizable and reducible pollutants, particularly nitric oxides in addition to organic compounds and carbon monoxide, the problem arises of oxidizing the two first mentioned impurities and of reducing the nitrogen oxides to harmless nitrogen.

It is known in the art that the reduction and oxidation of exhaust gas pollutants can be carried out by employing two catalyst beds connected in series. The first of these beds is filled with a reduction catalyst, and may be acted upon by the exhaust gas without the addition of secondary air. In the first bed, a reduction of the nitrogen oxides by means of the oxidizable components contained in the exhaust gas takes place. Since the exhaust gas contains considerably larger quantities of oxidizable components than are needed for the reduction of nitrogen oxides, an oxidation step must follow the reduction step. A second catalyst bed is connected in series to the first, and the exhaust gas from step one, or from the first catalyst bed, is introduced into said second bed with the addition of secondary air.

Depending upon the operational conditions of an internal combustion engine, characterized by the air/fuel ratio lambda variable quantities of residual oxygen are emitted in the exhaust gas. For reduction step therefore, a catalyst is desired, which will effect reduction of nitrogen oxides even when said nitrogen oxides contain greater than stoichiometric amounts of oxygen.

A catalyst satisfying these conditions will not only improve the catalytic effectiveness of two bed systems but beyond this it opens up the possibility of using a one bed system, instead of the two bed system; reduction and oxidation can be carried out at the same time in such a one bed system. Tests which have been conducted with catalysts described in German Pat. No. 1,283,247, which are employed in the reduction step, in operational conditions with lambda greater than 1, i.e., more than stoichiometric quantities of oxygen, have not yielded satisfactory results with regard to nitrogen oxide conversions.

Accordingly, a catalyst has been discovered which will effect reduction of nitrogen oxides by the oxidizable pollutants, followed by oxidation of said oxidizable pollutants. It has been discovered that said catalyst obviates the requirements of two serial connected catalyst beds. Said newly discovered catalyst is effective in reducing reducible pollutants in exhaust gases from internal combustion engines and industrial plants, when stoichiometric quantities of oxygen are in excess of the reducible pollutant component of said exhaust gases.

As stated above, the invention resides in employing the starting catalyst or starting material, which has heretofore been characterized as possessing extraordinary endurance limits of stress and insensitivity to high operating temperatures. The basic invention is directed to the catalyst composition comprising (A) a starting material comprising a mixture of catalytically active aluminum oxide and more than 50% by weight of at least two metal oxides, one of which is chromium oxide, and the other oxide of which is at least one oxide of an element of the First Transition Series; and (B) an impregnant for said starting material comprising a catalytically active metal selected from the group consisting of noble metals. The impregnant is converted into catalytically active metal, metal oxide or mixtures thereof. As stated above, the starting material may optionally contain a maximum of 10% by weight of a compound of an element of Group II.

Therefore, the invention rests on the impregnation of starting materials or starting catalysts, which are conventionally classified as mixed catalysts in that they are completely catalytically active compositions, consisting of oxidic compounds of non-noble secondary group metals and eta and gamma-aluminum oxide, with noble metals.

What is meant by catalytically active aluminum oxide is eta and gamma alumina and mixtures thereof. Catalytically active aluminum oxides may be prepared by precipitating hydrous alumina gels and drying, and then calcining at temperatures above 300° C. The eta and gamma-aluminum oxide is the catalytically active aluminum oxide component.

The invention will be more fully understood with reference to a preferred embodiment of the product and the process for producing said product which will be described below. The utility and superiority of the catalyst compositions presented herein are set forth hereinafter.

In a preferred embodiment of the catalyst composition, a starting catalyst comprising a mixed catalyst is prepared. The preparation of said starting catalyst comprises forming a mixture of a catalytically active aluminum oxide, preferably a mixture of eta and gamma-aluminum oxide and more than 50% by weight of at least two metal oxides, one of which is chromium oxide and the other oxide of which is at least one oxide of an element of the First Transition Series. Preferably, the composition of catalytically active aluminum oxides contains between 55% and 90% by weight of at least two metal oxides, one of which is chromium oxide and the other oxide of which is an oxide of an element of the First Transition Series. As set forth herein, an element of the First Transition Series is meant to include titanium, vanadium, manganese, iron, cobalt, nickel, copper and zinc. As set forth above, the starting material or mixed catalyst may optionally include a maximum of 10% by weight of a compound of an element of Group II. As set forth herein, an element of Group II is meant to include beryllium, magnesium, calcium, strontium and barium. Preferably, an element of Group II, when present in said starting catalyst, is present in the ranges of between 0.5 - 10% by weight of starting material.

As stated above, the objects of the invention include impregnating said starting catalyst with a catalytically active noble metal. As set forth herein, the term "noble metal" is meant to include palladium, platinum, rhodium, iridium, ruthenium and mixtures thereof. A maximum of less than 2% by weight of noble metal component is present in the ultimate product comprising starting catalysts and noble metal impregnant. Preferably up to 1% noble metal may be present. In fact, excellent results are obtained when approximately 0.1 - 0.5% of noble metal constituent is present in the ultimate product, as can be seen from the examples.

A preferred process of producing the aforementioned catalyst composition comprises the following sequence of preparations. Firstly, a mixture of at least two metal oxides, one of which is chromium oxide and the other oxide of which is an oxide of an element of the First Transition Series, is prepared. Said oxide mixture may be conveniently prepared by reacting a compound, particularly a salt, of chromium with a compound, particularly a salt, of an element of the First Transition Series. If the presence of an element from Group II as defined above, is desired in the final product, the compound, particularly the salts, of one of said elements, is included in the reaction mixture containing a salt of chromium and a salt of an element of the First Transition Series. The reaction between said salts is usually undertaken in an aqueous solution, which may be heated, and results in a precipitate which is easily separated. The precipitate may be separated by conventional means, such as by suction filtration. The precipitate is dried, pulverized and reheated for approximately one hour to 350° to 400° C. The dried and reheated product is then ground to a grain size of smaller than 70 microns, preferably to a grain size of smaller than 60 microns.

Subsequently, the precipitate containing chromium compounds and a compound of an element of the First Transition Series is mixed with aluminum oxide. Conveniently, the aluminum oxide is in the form of an aluminum oxide press cake with an $Al_2O_3$ solids content of 6.7%. Conveniently, the aluminum oxide and mixture of catalytically active oxides is in a paste form. Said paste containing the aluminum oxide, chromium compounds and compounds of elements of the First Transition Series are mixed and homogenized for several hours. The paste is then dried. Drying is usually effected at approximately 120° C.

After drying, the aluminum oxide is subsequently ground to grain sizes below 60 microns, and preferably to grain sizes below 50 microns. The product of this step containing aluminum oxide, the chromium compound and compounds of the First Transition Series are designated henceforth as a "mix." This "mix" contains the components of the product referred to above as the starting material or starting catalyst.

In a preferred embodiment of this invention, the "mix" is processed with a conventional binder. Conventional binders heretofore employed in the prior art include graphite, stearic acid, tylose, tragacanth, starch, and/or organic binders, for example, gum arabic, colophonium, acrylic resins, alkyd resins, and phenol resins. The mix and binder are worked into a compressible mass and molded. Preparation of the molded composition and molding may be undertaken by any of the prior art methods. In one embodiment, the compressible mass is molded into strands by way of an extruder.

By way of example, not necessarily a preferred embodiment, the molded articles may be of various diameters in the range of from 1 to 4 millimeters. The extruded or molded products are then dried. Drying may be effected by elevated temperatures of approximately 120°. Then those molded products or articles are reheated for a period of time at elevated temperatures ranging from between 400° and 900°, preferably between 450° and 500° C.

The starting catalyst is prepared in a preferred embodiment by the above-described procedure. At this point in the process, the starting catalyst may be impregnated with a compound, particularly a salt, of a noble metal. Preferably, or most conveniently, the starting catalyst is impregnated with a water soluble, non-volatile, thermally decomposable metal salt. By way of example, a salt such as palladium nitrate would be suitable in view of those aforementioned limitations, in that the impregnant is thermally decomposable in air, possibly after one drying step. Rendering or providing the noble metal impregnant catalytically active usually means providing the corresponding metal oxide. Providing the corresponding noble metal or catalytically active noble metal component, or mixtures thereof, may be effected (a) by thermal decomposition of nobe metal compounds in air; (b) by oxidation or (c) by reduction; the method will depend on the form of the noble metal compound and on the noble metal itself which is employed.

According to a preferred method of operation, the starting catalyst is impregnated with solutions of a complex salt or salts of the above-mentioned noble metals, thermally decomposable at temperatures between 100° and 600° C. Not by way of limitation, but rather by way of example, compounds which satisfy those aforementioned limitations include $(NH_4)_2[PtCl_6]$, $[Pt(NO_2)_2(NH_3)_2]$ and $RhCl_3 \cdot xH_2O$.

According to a favorable variation, the starting catalyst is impregnated with an alkali carbonate solution containing said complex salt. The addition of carbonate causes the formation of a precipitate of basic noble metal carbonates, which accumulate particularly voluminously and which during further processing result in a high specific surface of noble metals.

A particularly active catalyst is obtained by impregnating the starting catalyst with an alkali carbonate solution containing alkali tetrachloropalladate. The impregnated starting catalyst is subsequently dried, then treated with aqueous solutions of an oxidizing agent, for example, hydrogen peroxide, after which drying is effected by reheating the impregnated starting catalysts at temperatures in the range between 300° and 500° C. The oxidation treatment may be carried out at room temperature.

A known measure which may be employed within the scope of the process of this invention consists in reducing the impregnant noble metal salts with known reagents, such as hydrogen or sodium formate.

EXAMPLE 1

A starting catalyst is produced as follows and following German Pat. No. 1,283,247:

12.6 kg ammonium bichromate are dissolved in 60 l of water and 16.8 l of a 25% ammonia solution is added. This solution is added with stirring to a heated solution of 21.8 kg Cu $(NO_3)_2 \cdot 3H_2O$ and 2.6 kg Ba $(NO_3)_2$ in 80 l of water. The precipitate obtained is separated by suction filtration from the liquid, is dried in a dryer in air for all together 10 hours at 120° to 130° C., is subsequently comminuted and reheated in this form for one hour to 350°–400° C. in a muffle furnace. The powdery starting material is then ground to a grain size of smaller than 60μ.

Subsequently 100 kg of an aluminum oxide press cake with an $Al_2O_3$ solids contents of 6.7% is mixed and homogenized in a kneader with 15.7 kg of the barium doped oxide of copper and chrome for three hours. Said press cake was produced by precipitation of an aluminum sulfate solution with sodium hydroxide solution, subsequently, washing, and pressing (squeezing) in a filter press. The paste is then dried for 12 hrs. on racks at 120° C. in a box furnace, is broken in a Pfleiderer sifter with 2 mm unit and is subsequently ground on a disc crusher to grain sizes below 50μ. This product is designated henceforth as "mix."

16 kg of the mix are then processed with 540 ml nitric acid (density 1.3), 600 g stearic acid and 5.8 l of water into a compressable mass and is molded into strands in an extruder.

At the same time, molded articles of various diameters in the range from 1 to 4 mm can be obtained. The extruded strands are then dried over night on racks at 120° C. in a box furnace, and can then be reheated by steps for 2 hrs. at 500° C. in a muffle furnace. The starting catalyst obtained contains 70% by weight of barium doped copper chromium oxide (molar composition 1.9 CuO:1 $Cr_2O_3$:0.13 BaO) and 30% by weight of aluminum oxide of the $\eta$, $\gamma$ series. 100 g of a starting catalyst with 2 mm diameter are impregnated with 28 ml of a solution, which contains 1.53 g $K_2PdCl_4$ and 2.8 g $K_2CO_3$. Subsequently, the catalyst material is dried at 120° C. The dried product is then treated with 750 ml washing water, to which 3.5 ml 35% hydrogen peroxide are added. After renewed drying at 120° C., the catalyst material is reheated for 0.5 hrs at 450° C. A catalyst A will result which contains 0.5% Pd in the form of PdO.

EXAMPLE 2

100 g of the 70/30 copper chrome oxide-aluminum oxide starting catalyst given in example 1 are impregnated with 28 ml of an aqueous $PdCl_2$ solution, which contains 0.5% Pd, and are subsequently dried at 120° C. The dried catalyst is reduced with a 5% sodium formate solution; subsequently it is washed with 500 ml of water, dried at 120° C. and then reheated for 0.5 hrs. at 450° C. The catalyst is designated henceforth as B.

Instead of the wet reduction with sodium formate, one can use a treatment of the impregnated catalyst in a hydrogen stream at 150° C. for 0.5 hrs.

EXAMPLE 3

A starting catalyst is produced as follows in accordance with German patent 1,283,287:

A solution of 10.2 kg $Ni(NO_3)_2 \cdot 6 H_2O$ in 10 l water and a solution of 6.9 kg $CrO_3$ in 7 l of water are mixed and subsequently evaporated to dryness. The resulting material is dried in the dryer at about 180° – 200° C., is subsequently comminuted and reheated for 2 hrs. in a muffle furnace at 800° C. The powdery starting material is then ground to a grain size of 60 μ

6 kg of the nickel/chromium oxide thus produced are then mixed with 4 kg aluminum oxide of the $\eta$, $\gamma$ -series, which has a similar grain size as the powder of the oxides of copper and chrome, is peptized and sprayed with water, then it is worked up in a kneader, then again dried at 120° C. The cake obtained is reduced to a grain size between 0.1 – 1.5 mm, and after addition of 350 g of graphite as an auxiliary molding agent, it is molded in a rotary tablet press. The molded articles are heated to 450° – 500° C.

The starting catalyst obtained contains 60% by weight nickel chromium oxide (molar composition NiO: $Cr_2O_3$ = 1:1) and 40% by weight aluminum oxide of the $\eta$, $\gamma$ - series.

100 g of this starting catalyst are impregnated with 33 ml of an aqueous solution, which contains 66 mg Pt in the form of $H_2PtCl_6$ and 34 mg of rhodium in the form of $RhCl_3 \cdot X H_2O$, this is dried at 120° C. and reduced at 150° C. in a hydrogen stream. Subsequently it is reheated in air for 0.5 hrs. at 450° C. Henceforth, the catalyst is designated as C.

EXAMPLE 4

A starting catalyst is produced as follows, in accordance with German Pat. No. 1,283,247; 6.68 kg $(NH_4)_2Cr_2O_7$ are dissolved in a 31.8 l of water and then 9.8 l 25% ammonia are added. This solution is inserted while stirring into a heated (about 50° C.) solution of 11.56 kg $Co(NO_3)_2 \cdot 6 H_2O$ in 16 l of water, the precipitation product formed is heated to 50° C. while stirring, is washed by decanting and sucking off, and dried at 120° C. The mass obtained that way is then heated in a muffle furnace for 1 hour at 350° to 400° C.

Subsequently 100 kg of the aluminum oxide press cake, described in more detail in Example 1, is then worked up with 8.2 kg of the cobalt chromium oxide into 2 mm molded strands, according to a process likewise mentioned in Example 1.

The starting catalyst obtained contains 55% by weight of cobalt chromium oxide (molar composition CoO: $Cr_2O_3$ as 1.5:1) and 45% by weight of aluminum oxide of the $\eta$, $\gamma$ - series.

100 g of this starting catalyst are impregnated with 35 ml of an aqueous hexachloroiridium - (IV) - acid solution, which contains 200 mg iridium, and is reduced as described in Example 3. This catalyst, henceforth, is designated by D.

EXAMPLE 5

In accordance with German patent 1,283,247, a starting catalyst is produced as follows:

6.86 kg $(NH_4)_2Cr_2O_7$ are dissolved in 32.6 l of water and then 9.14 l of 25% ammonia are added. This solution is added to a heated (about 50° C.) solution of about 13.66 kg $MN(No_3)_2 \cdot 4H_2O$ in 21.8 l of water with stirring, the developed precipitate is heated to 50° C. with stirring, it is washed by decanting and sucking, and dried at 120° C. The mass thus obtained is reheated in the muffle furnace for 1 hour at 400° C.

Subsequently 100 kg of the aluminum oxide press cake, described in more detail in Example 1, are worked up with 13.4 kg of the manganese chromium oxides into molded strands with 2 mm diameter, according to the process mentioned in Example 1.

The starting catalyst obtained contains 60% by weight of manganese chromium oxide (molar composition MnO: $Cr_2O_3$ as 2:1) and 30% by weight aluminum oxide of the $\eta$, $\gamma$ - series.

100 g of this starting catalyst are impregnated with 28 ml of an aqueous ruthenium - (III) - chloride solution, which contains 200 mg Ru, and is processed further as described in Examples 3 or 4. Henceforth, the catalyst is designated as E.

EXAMPLE 6

100 g of the starting catalyst from Example 1 (weight ratio of copper chromium oxide/aluminum oxide = 70:30) are impregnated with 28 ml of an aqueous solution of dinitrodiamino platinum (II) i.e., [Pt $(NO_2)_2$ $(NH_3)_2$], with 200 mg of platinum and are dried at 120° C. Subsequently it is slowly heated in the air current at 200° C. for the decomposition of the platinum salt. Henceforth the catalyst is designed as F.

EXAMPLE 7

The types of catalysts described in the examples 1 - 6 are inserted into a test apparatus in order to measure their catalytic effectiveness, which apparatus consists of a mixing and dosing part for the production of the test gas mixture, a reaction tube located in a tube furnace and a part for analysis. For the production of the gas mixtures, the gases are taken from pressure flasks, metered in proper quantity via rotameters and mixed with fillers in a mixing vessel. The mixed gas produced is then fed to the reaction part, whereby the used gas control is accomplished by taking a sample via a by pass-line. The drop in pressure along the bulk material reactor can be measured with the help of monometers. The temperatures of the furnace and of the reaction zone in the catalyst pilings is measured with the help of sheathed thermo elements introduced centrally into the reaction tubes, and continuously registered on a recorder.

The emerging gas is conducted into a reaction gas distributor. The determination of CO and $O_2$ is accomplished gas chromatographically. For the determination of the hydrocarbons, a flame ionization detector is used. The determination of the nitric oxides is carried out with the help of a selective electrode. In order to demonstrate the improved catalytic effectiveness of the catalysts impregnated with noble metals according to German Pat. No. 1,283,247, in the case of the reduction of nitric oxides in oxygen-containing exhaust gases, the following test mixture is used:

1.5 vol. % $H_2$,
3.0 vol. % CO,
0.2 vol. % NO,
0.5 vol. % $C_3H_6$,
3.6 - 5.4 vol. % $O_2$,
Rest $N_2$.

The volume velocity amounts to 40,000 Nl/hr. . 1 catalyst. The catalyst temperature is 480° C.

The results for catalyst Type A and the starting catalyst produced according to German Pat. No. 1,283,247 and not coated with palladium oxide (henceforth called comparative catalyst A') are contained in the following Table 1. For the sake of a clearer view, an oxidation number is defined, which is formed from the quotient vol. % $O_2$ is the exhaust gas/related to the vol. % $O_2$ required for the complete combustion of combustible components in the test gas mixture. A quotient less than one indicates that the volume percent oxygen in the exhaust gas is stoichiometrically deficient for the complete combustion of combustible components in the test gas mixture. A quotient larger than one indicates that the volume percent oxygen in the exhaust gas is in a stoichiometric excess of the amount required for the complete combustion of combustible components in the test gas mixture.

Table 1

Catalytic effectiveness of the catalyst samples A and A'
Reaction temperature 480° C; GHSV = 40,000 $h^{-1}$

| Catalyst sample | Oxidation Number | Catalytic conversion | | |
|---|---|---|---|---|
| | | CO (%) | $C_3H_6$ (%) | NO (%) |
| A' Comparative catalyst | 0.8 | 92 | 61 | 81 |
| | 0.9 | 100 | 75 | 76.5 |
| | 1.0 | 100 | 91 | 67.5 |
| | 1.1 | 100 | 95 | 3.0 |
| | 1.2 | 100 | 100 | 0 |
| A | 0.8 | 100 | 67 | 92 |
| | 0.9 | 100 | 80 | 85 |
| | 1.0 | 100 | 97 | 75 |
| | 1.1 | 100 | 100 | 64 |
| | 1.2 | 100 | 100 | 10 |

The results show the clearly improved catalytic effectiveness especially for the nitric oxides in the range of higher oxidation numbers.

For the other catalysts mentioned in the examples 1 through 6, corresponding measurement values were determined. Table 1 shows, that the differences in the catalytic effect are particularly striking in the range of the oxidation number 1.1. In the subsequent Table 2, therefore, the comparative numbers for the catalyst samples B through F and for the corresponding starting catalysts B' through F', not treated with noble metals, are summarized:

Table 2

Catalytic effectiveness of the catalysts at the oxidation number 1.1
Reaction temperature 480° C.; GHSV = 40,000 $h^{-1}$

| Catalyst sample | Catalytic degrees of conversion | | |
|---|---|---|---|
| | CO (%) | $C_3H_6$ (%) | NO (%) |
| A' | 100 | 95 | 3.0 |
| A | 100 | 100 | 64.0 |
| B' = A' | 100 | 95 | 3.0 |
| B | 99.6 | 98.0 | 38.5 |
| C' | 87.0 | 92.0 | 18.7 |
| C | 100 | 100 | 57 |
| D | 93.9 | 95.2 | 0 |
| D' | 100 | 98.8 | 65.7 |
| E' | 84.3 | 89.3 | 0 |
| E | 95.8 | 92.8 | 20.2 |
| F' = A' | 100 | 95 | 3.0 |
| F | 100 | 98.7 | 54.3 |

It is striking that catalyst A, produced according to Example 1 and treated as an impregnated raw product with hydrogen peroxide, shows a better catalytic effectiveness than the catalyst B provided with noble metal according to a traditional method.

EXAMPLE 8

Catalyst A, described in Example 1, was connected in the proper catalyst containers to the exhaust pipes of a standard motor vehicle and was tested for its catalytic effectiveness according to the roller test stand test published according to regulations in the Federal Register, Vol. 35, of the U.S. Department of Health, Education and Welfare. Corresponding evaluation according to the guidelines provided for 1975 (3 pouch test) resulted in the following conversion values:

93% for hydrocarbons,
87% for carbon monoxide,
89% for nitric oxide.

At the same time conversions of more than 98% were measured in the warm phase (Comparison of the non-purified and purified concentration of harmful substances in the second pouch) for all three compounds.

Thus, it is apparent that there has been provided, in accordance with the invention, a catalyst product and a process for producing said catalyst that fully satisfies the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations in the spirit and scope of the appendent claims.

What is claimed is:

1. In an improved process for preparing a catalyst, said process comprising preparing a homogeneous, particulate mixture comprising catalytically active eta- and gamma- aluminum oxide and more than 50% by weight of at least two metal oxides, one of said metal oxides being chromium oxide and the other metal oxide being selected from the group consisting of titanium oxide, vanadium oxide, manganese oxide, iron oxide, cobalt oxide, nickel oxide, copper oxide and zinc oxide, wherein the improvement comprises impregnating said mixture with a solution of at least one salt of a noble metal selected from the group consisting of palladium, platinum, rhodium, iridium and ruthenium, drying the resulting impregnated composition, and rendering the noble metal impregnant catalytically active by: (a) thermal decomposition in air, (b) oxidation, or (c) reduction; wherein said catalyst contains less than 2 weight percent noble metal component.

2. Process according to claim 1 wherein said at least two metal oxides in said mixture comprise about 55–90 weight percent of said mixture.

3. Process according to claim 1 wherein said catalyst includes between 0.5–10% by weight of an oxide of beryllium, magnesium, calcium, strontium or barium based on the weight of said mixture.

4. Process according to claim 3 wherein said catalyst includes between 0.5–10% by weight of an oxide of beryllium, magnesium, calcium, strontium or barium based on the weight of said mixture.

5. Process according to claim 3 wherein, prior to said impregnation, a binder is combined with said mixture; the resulting composition is molded; and the molded composition is heated at an elevated temperature.

6. Process according to claim 1 wherein said mixture is impregnated with an alkali metal carbonate solution containing at least one complex salt of said noble metals.

7. Process according to claim 3 wherein said mixture is impregnated with an alkali metal carbonate solution containing at least one complex salt of said noble metals.

8. Process according to claim 1 in which said impregnation is carried out with at least one water soluble, nonvolatile, thermally decomposable salt of said noble metals.

9. Process according to claim 1 in which said noble metal comprises up to 1% by weight of said catalyst.

10. Process according to claim 1 in which said noble metal comprises about 0.1–0.5% by weight of said catalyst.

11. Process according to claim 1 wherein said at least two metal oxides comprise the reaction product of a chromium salt and at least one salt of a metal selected from the group consisting of titanium, vanadium, manganese, iron, cobalt, nickel, copper and zinc; wherein said salts are reacted in aqueous solution to form a precipitate; said precipitate is dried, pulverized and reheated for about one hour to 350° to 450° C; and said precipitate is then ground to a particular size less than 70 microns.

12. Process according to claim 2 in which said aluminum oxide is provided by a press cake having an $Al_2O_3$ solids content of 6.7% by weight.

13. Process according to claim 5 in which said binder is graphite, stearic acid, tylose, tragacanth, starch, gum arabic, colophonium, an acrylic resin, an alkyl resin or a phenolic resin.

14. Process according to claim 13 in which the molded composition is heated at between 450° and 500° C.

15. Process according to claim 8 in which said salt is palladium nitrate.

16. Process according to claim 1 wherein said mixture is impregnated with at least one complex salt of said noble metals thermally decomposable at temperatures between 100° and 600° C.

17. Process according to claim 16 in which said complex salt is $(NH_4)_2[PtCl_6]$, $[Pt(NO_2)_2 (NH_3)_2]$ or $RhCl_3 \cdot xH_2O$.

18. Process according to claim 6 in which said impregnation is carried out with an alkali metal carbonate solution containing alkali metal tetrachloropalladate, the resulting impregnated catalyst is dried and then treated with an aqueous solution of an oxidizing agent, and the treated catalyst is dried by heating between 300° and 500° C.

19. Process according to claim 18 in which said oxidizing agent is hydrogen peroxide.

20. Process according to claim 19 in which oxidation is carried out at room temperature.

21. Process according to claim 18 in which the impregnated noble metal salt is chemically reduced with hydrogen or sodium formate.

22. Process according to claim 1 wherein said resulting impregnated mixture is rendered catalytically active by thermal decomposition of said noble metal salts in air.

23. Process according to claim 22 wherein said mixture is impregnated with at least one complex salt of said noble metals thermally decomposable at temperatures between 100° and 600° C.

24. A composition comprising a homogeneous, particulate mixture of catalytically active eta- and gamma-aluminum oxide and more than 50% by weight of at least two metal oxides, one of said metal oxides being chromium oxide and the other metal oxides being selected from the group consisting of titanium oxide, vanadium oxide, manganese oxide, iron oxide, cobalt oxide, nickel oxide, copper oxide and zinc oxide, said mixture having deposited thereon a noble metal selected from the group consisting of palladium, platinum, rhodium, iridium and ruthenium; wherein said catalyst contains less than 2 weight percent noble metal.

25. Composition according to claim 24 wherein said at least two metal oxides in said mixture comprise about 55–90 weight percent of said mixture.

26. Composition according to claim 25 wherein said catalyst includes between 0.5–10% by weight of the oxide of beryllium, magnesium, calcium, strontium or barium based on the weight of said mixture.

27. Composition according to claim 25 in which said compound is at least one water soluble, non-volatile, thermally decomposable salt of said noble metals.

28. Composition according to claim 27 in which said aluminum oxide is provided by a press cake having an $Al_2O_3$ solids content of 6.7% by weight.

29. Composition according to claim 27 in which said mixture includes a binder selected from the group consisting of graphite, stearic acid, tylose, tragacanth, starch, gum arabic, colophonium, an acrylic resin, an alkyl resin or phenolic resin.

30. A catalyst comprising a homogeneous, particulate mixture of catalytically active eta- and gamma- aluminum oxide and more than 50% by weight of at least two metal oxides, one of said metal oxides being chromium oxide and the other metal oxides being selected from the group consisting of titanium oxide, vanadium oxide, manganese oxide, iron oxide, cobalt oxide, nickel oxide, copper oxide and zinc oxide, said mixture having deposited thereon less than 2 weight percent of a catalytically active noble metal, noble metal oxide or mixtures thereof, said noble metal selected from the group consisting of palladium, platinum, rhodium, iridium and ruthenium; wherein said catalyst contains less than 2 weight percent noble metal component.

31. Catalyst according to claim 30 wherein said at least two metal oxides in said mixture comprise about 55–90 weight percent of said mixture.

32. Catalyst according to claim 30 wherein said catalyst includes between 0.5–10% by weight of an oxide of beryllium, magnesium, calcium, strontium or barium based on the weight of said mixture.

33. Catalyst according to claim 31 wherein said catalyst includes between 0.5–10% by weight of an oxide of beryllium, magnesium, calcium, strontium or barium based on the weight of said mixture.

34. Catalyst according to claim 32 wherein a binder is combined with said mixture.

35. Catalyst according to claim 31 in which said noble metal comprises up to 1% by weight of said catalyst.

36. Catalyst according to claim 30 in which said noble metal comprises about 0.1–0.5% by weight of said catalyst.

37. Catalyst according to claim 30 wherein said at least two metal oxides comprise the reaction product of a chromium salt and at least one salt of a metal selected from the group consisting of titanium, vanadium, manganese, iron, cobalt, nickel, copper and zinc; wherein said salts are reacted in aqueous solution to form a precipitate; said precipitate is dried, pulverized and re-heated for about one hour to 350° to 450° C; and said precipitate is then ground to a particle size less than 70 microns.

38. Catalyst according to claim 31 in which said aluminum oxide is provided by a press cake having an $Al_2O_3$ solids content of 6.7% by weight.

39. Catalyst according to claim 34 in which said binder is graphite, stearic acid, tylose, tragacanth, starch, gum arabic, colophonium, an acrylic resin, an alkyl resin or a phenolic resin.

40. Catalyst according to claim 31 in which said mixture is in the form of a molded article.

41. Catalyst according to claim 30 in which said noble metal is provided by impregnating said mixture with a solution of at least one salt of said noble metals.

42. Composition according to claim 24 in which said noble metal comprises up to 1% by weight of said catalyst.

43. Composition according to claim 24 in which said noble metal comprises about 0.1–0.5% by weight of said catalyst.

44. Composition according to claim 24 wherein said at least two metal oxides comprise the reaction product of a chromium salt and at least one salt of a metal selected from the group consisting of titanium, vanadium, manganese, iron, cobalt, nickel, copper and zinc; wherein said salts are reacted in aqueous solution to form a precipitate; said precipitate is dried, pulverized and re-heated for about one hour to 350° to 450° C; and said precipitate is then ground to a particle size less than 70 microns.

45. Composition according to claim 24 in which said mixture is in the form of a molded article.

46. In an improved process for preparing a catalyst, said process comprising preparing a homogeneous, particulate mixture comprising catalytically active eta- and gamma- aluminum oxide and more than 50% by weight of at least two metal oxides, one of said metal oxides being chromium oxide and the other metal oxide being selected from the group consisting of titanium oxide, vanadium oxide, manganese oxide, iron oxide, cobalt oxide, nickel oxide, copper oxide and zinc oxide, wherein the improvement comprises impregnating said mixture with a solution of at least one complex salt of a noble metal which thermally decomposes at temperatures between 100° and 600° C selected from the group consisting of palladium, platinum, rhodium, iridium and ruthenium, drying the resulting impregnated composition and rendering the noble metal impregnant catalytically active.

47. A composition comprising a homogeneous, particulate mixture of catalytically active eta- and gamma- aluminum oxide and more than 50% by weight of at least two metal oxides, one of said metal oxides being chromium oxide and the other metal oxides being selected from the group consisting of titanium oxide, vanadium oxide, manganese oxide, iron oxide, cobalt oxide, nickel oxide, copper oxide and zinc oxide, said mixture having deposited thereon a noble metal selected from the group consisting of palladium, platinum, rhodium, iridium and ruthenium; wherein said catalyst contains less than 2 weight percent noble metal and wherein said noble metal was deposited from a solution of at least one complex salt thereof which thermally decomposes at temperatures between 100° C and 600° C.

48. In an improved process for preparing a catalyst, said process comprising preparing a homogeneous, particulate mixture comprising catalytically active eta- and gamma-aluminum oxide and more than 50% by weight of at least two metal oxides, one of said metal oxides being chromium oxide and the other metal oxides being selected from the group consisting of titanium oxide, vanadium oxide, manganese oxide, iron oxide, cobalt oxide, nickel oxide, copper oxide and zinc oxide, wherein the improvement comprises impregnating said mixture with a solution of at least one salt of a noble metal selected from the group consisting of palladium, platinum, rhodium, iridium and ruthenium, drying the resulting impregnated composition, and coverting the resulting impregnated composition into catalytically active metal, metal oxide or mixtures thereof by treating said impregnated composition with an aqueous solution of hydrogen peroxide as an oxidizing agent and subsequently drying the treated composition.

* * * * *